(12) United States Patent
Lukishova et al.

(10) Patent No.: US 7,253,871 B2
(45) Date of Patent: Aug. 7, 2007

(54) EFFICIENT ROOM-TEMPERATURE SOURCE OF POLARIZED SINGLE PHOTONS

(75) Inventors: Svetlana G. Lukishova, Honeoye Falls, NY (US); Robert W. Boyd, Rochester, NY (US); Carlos R. Stroud, Rochester, NY (US)

(73) Assignee: University of Rochester, Rochester, NY (US)

(*) Notice: Subject to any disclaimer, the term of this patent is extended or adjusted under 35 U.S.C. 154(b) by 486 days.

(21) Appl. No.: 10/753,323

(22) Filed: Jan. 9, 2004

(65) Prior Publication Data

US 2006/0187993 A1   Aug. 24, 2006

Related U.S. Application Data

(60) Provisional application No. 60/438,769, filed on Jan. 9, 2003.

(51) Int. Cl.
C09K 19/02 (2006.01)

(52) U.S. Cl. ............... 349/167; 349/191; 349/179; 349/194; 349/153; 349/164; 349/165; 372/27; 372/53

(58) Field of Classification Search ............. 372/39, 372/53, 51, 27, 70, 71; 356/300, 317, 318; 315/111.81; 380/44; 349/153, 163–165, 349/167, 172, 179, 184, 186, 191, 194
See application file for complete search history.

(56) References Cited

U.S. PATENT DOCUMENTS

| | | | | |
|---|---|---|---|---|
| 4,556,287 A * | 12/1985 | Funada et al. | ............... | 349/164 |
| 4,841,009 A * | 6/1989 | Kelsey | ............... | 528/75 |
| 5,334,424 A * | 8/1994 | Hani et al. | ............... | 428/1.6 |
| 5,384,067 A * | 1/1995 | Doane et al. | ............... | 349/183 |
| 5,552,915 A * | 9/1996 | Khoo | ............... | 349/200 |
| 5,780,162 A | 7/1998 | Toyoda et al. | | |
| 5,861,637 A | 1/1999 | Oishi | | |
| 5,870,419 A | 2/1999 | Nakayama | | |
| 5,989,758 A * | 11/1999 | Komatsu et al. | ............... | 430/20 |
| 6,037,471 A * | 3/2000 | Srinivasa et al. | ............... | 546/257 |
| 6,106,908 A * | 8/2000 | Duffy et al. | ............... | 428/1.1 |
| 6,141,367 A * | 10/2000 | Fan et al. | ............... | 372/53 |
| 6,239,778 B1 * | 5/2001 | Palffy-Muhoray et al. | .... | 345/87 |
| RE37,509 E * | 1/2002 | Bradshaw et al. | ............... | 349/172 |
| 6,727,065 B2 * | 4/2004 | Weiss et al. | ............... | 435/6 |
| 6,728,281 B1 * | 4/2004 | Santori et al. | ............... | 372/45.01 |
| 7,068,698 B2 * | 6/2006 | Moerner et al. | ............... | 372/70 |
| 2002/0000984 A1 * | 1/2002 | Asai et al. | ............... | 345/211 |
| 2002/0008841 A1 * | 1/2002 | Ohmuro | ............... | 349/202 |
| 2002/0146052 A1 * | 10/2002 | Moerner et al. | ............... | 372/53 |
| 2003/0054356 A1 * | 3/2003 | Jacobson et al. | ............... | 435/6 |
| 2003/0152228 A1 * | 8/2003 | Gerard et al. | ............... | 380/220 |
| 2004/0218649 A1 * | 11/2004 | Moerner et al. | ............... | 372/53 |

OTHER PUBLICATIONS

Bobrovsky et al., "Cholesteric Mixtures with Photochemically Tunable, Circularly Polarized Fluroescence," Advanced Materials, vol. 15, No. 3, pp. 282-287, Feb. 5, 2003.

(Continued)

Primary Examiner—Haissa Philogene
(74) Attorney, Agent, or Firm—Blank Rome LLP

(57) ABSTRACT

An efficient technique for producing deterministically polarized single photons uses liquid-crystal hosts of either monomeric or oligomeric/polymeric form to preferentially align the single emitters for maximum excitation efficiency. Deterministic molecular alignment also provides deterministically polarized output photons; using planar-aligned cholesteric liquid crystal hosts as 1-D photonic-band-gap microcavities tunable to the emitter fluorescence band to increase source efficiency, using liquid crystal technology to prevent emitter bleaching. Emitters comprise soluble dyes, inorganic nanocrystals or trivalent rare-earth chelates.

128 Claims, 6 Drawing Sheets

OTHER PUBLICATIONS

Finkelmann et al., "Tunable Mirrorless Lasing in Cholesteric Liquid Crystalline Elastomers," Advanced Materials, vol. 13, No. 14, pp. 1069-1072, Jul. 18, 2001.

Moreau et al., "Single-mode solid-state Photon source based on isolated quantum dots in pillar micorcavities," Applied Physics Letters, vol. 79, No. 18, pp. 2865-2867, Oct. 29, 2001.

Ambrose et al., "Fluroescence photon antibunching from single molecules on a surface," Chemical Physics Letters, vol. 269, pp. 365-370, May 2, 1977.

Lounis et al., "Photon antibunching in single CdSe/ZnS quantum dot fluorescence," Chemical Physics Letters, vol. 329, pp. 399-404, Oct. 27, 2000.

Beverators et al., "Room temperature stable single-photon source," The European Physical Journal D, vol. 18, pp. 191-196, 2002.

Katsis et al., "Mechanistic insight into circularly polarized photoluminescence from a chiral-nematic film" Liquid Crystals, Vo. 26, No. 2, pp. 181-185, 1999.

Chen et al., "Circularly polarized light generated by photoexcitation of luminophores in glassy liquid -crystal films," Letters to Nature, vol. 397, pp. 506-508, 1999.

Kim et al., "A single-photon turnstite device," Letters to Nature, vol. 397, pp. 500-503, 1999.

Klarreich, "Can you keep a secret? Practical products are about to emerge from the weird world of quantum mechanics. Erica Klarreich finds out how quantum cryptography made it from the lab to the marketplace," Nature, vol. 418, Jul. 18, pp. 270-2002.

Knill et al., "A scheme for efficient quantum computation with linear optics," Nature, vol. 409, pp. 46-52, Jan. 4, 2001.

Lounis et al., "Single photons on demand from a single molecule at room temperature," Nature, vol. 407, pp. 491-493, Sep. 28, 2000.

Michler et al., "Quantum correlation among photons from a single quantum dot at room temperature," Nature, vol. 406, pp. 968-970, Aug. 31, 2000.

Brouri et al., "Photon antibunching in the fluorescence of individual color centers in diamond," Optics Letters, vol. 26, No. 17, pp. 1294-Sep. 1, 2000.

Kopp et al., "Low-threshold lasing at the edge of a photonic stop band in cholesteric liquid crystals," Optics Letters, vol. 23, No. 21, pp. 1707-1709, Nov. 1, 1998.

Messin et al., "Bunching and antibunching in the fluorescence of semiconductor nanocrystals," Optics Letters, vol. 26, No. 23, pp. 1891-1893, Dec. 1, 2001.

Treussart et al., "Photon antibunching in the fluorescence of a single dye molecule embedded in a thin polymer film," Optics Letters, vol. 26, No. 19, pp. 1504-1506, Oct. 1, 2001.

Bevaratos et al., "Nonclassical radiation from diamond nanocrystals," Physical Review, vol. 64, pp. 061802-1 to 068802-4, 2001.

Beveratos et al., "Single Photon Quantum Cryptography," Physical Review Letters, vol. 89, No. 18, pp. 187901-1 to 187901-4, Oct. 28, 2002.

Fleury et al., "Nonclassical Photon Statistics in Single-Molecule Fluroescence at Room Temperature," Physical Review Letters, vol. 84, No. 6, pp. 1148-1151, Feb. 7, 2000.

Imamoglu et al., "Turnstile Device for Heralded Single Photons: coulomb Blockade Electron and Hote Tunneling in Quantum Confined p-l-n Heterojunctions," Physical Review Letters, vol. 72, No. 2, pp. 210-213, Jan. 10, 1994.

Kurtsiefer et al., "Stable Solid-State Source of Single Photons," Physical Review Letters, vol. 85, No. 2, pp. 290-293, Jul. 10, 2000.

Pelton et al., "Efficient Source of Single Photons: A single Quantum Dot in a Micropost Microcavity," Physical Review Letters, vol. 89, No. 23, pp. 233602-1 to 233602-4, Dec. 2, 2002.

Santori et al., "Triggered Single Photons From A Quantum Dot," Physical Review Letters, Vo. 86, No. 8, pp. 1502-1505, Feb. 19, 2001.

Treussart et al., "Direct Measurement of the Photon Statistics of a Triggered Single Photon Source," Physical Review Letters, vol. 89, No. 9, pp. 093601-1 to 093601-Aug. 26, 2002.

Gisin et al., "Quantum cryptology," Reviews of Modern Physics, vol. 74, pp. 145-195, Jan. 2002.

Deschenes et al., "Single-Molecule Studies of Heterogeneous Dynamics In Polymer Melts near the Glass Transition," Science Magazine, vol. 292, pp. 255-258, Apr. 13, 2001.

Yuan et al., "Electrically Driven Single-Photon Source," Science Magazine, vol. 295, pp. 102-105, Jan. 4, 2002.

Il'chishin et al., "Generation of tunable radiation by impurity cholesteric liquid crystals," Shank Appl. Phys., Letter, vol. 18, pp. 395-396, 1971.

Bouwmeester et al., The Physics of Quantum Information, Springer, xvi, p. 314, 2000.

Nielsen et al., "Quantum Computation and Quantum Information," Cambridge University Press, ISBN-0-521-63503-9, 2000.

* cited by examiner

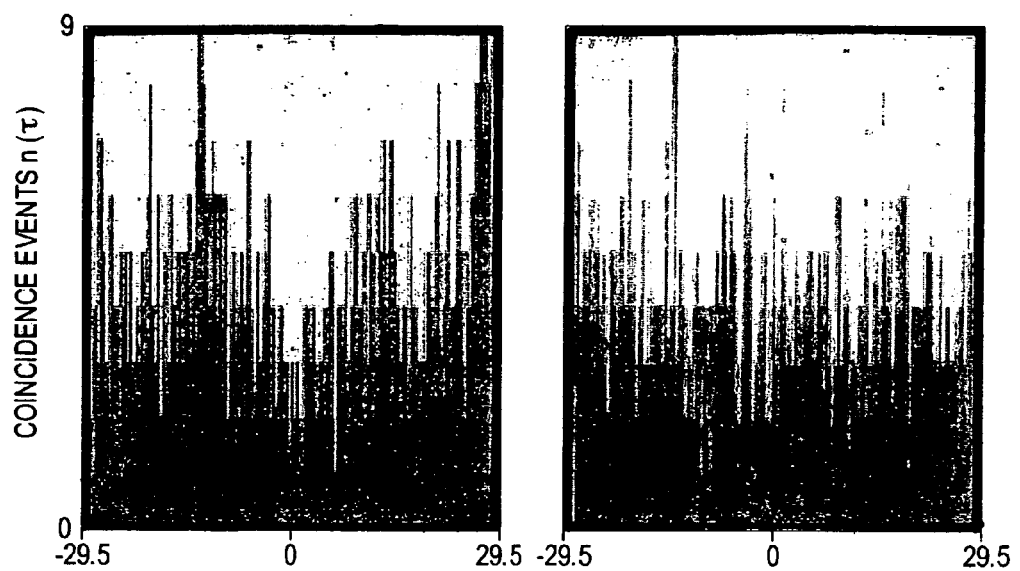
FIG. 9A  FIG. 9B
FIG. 12
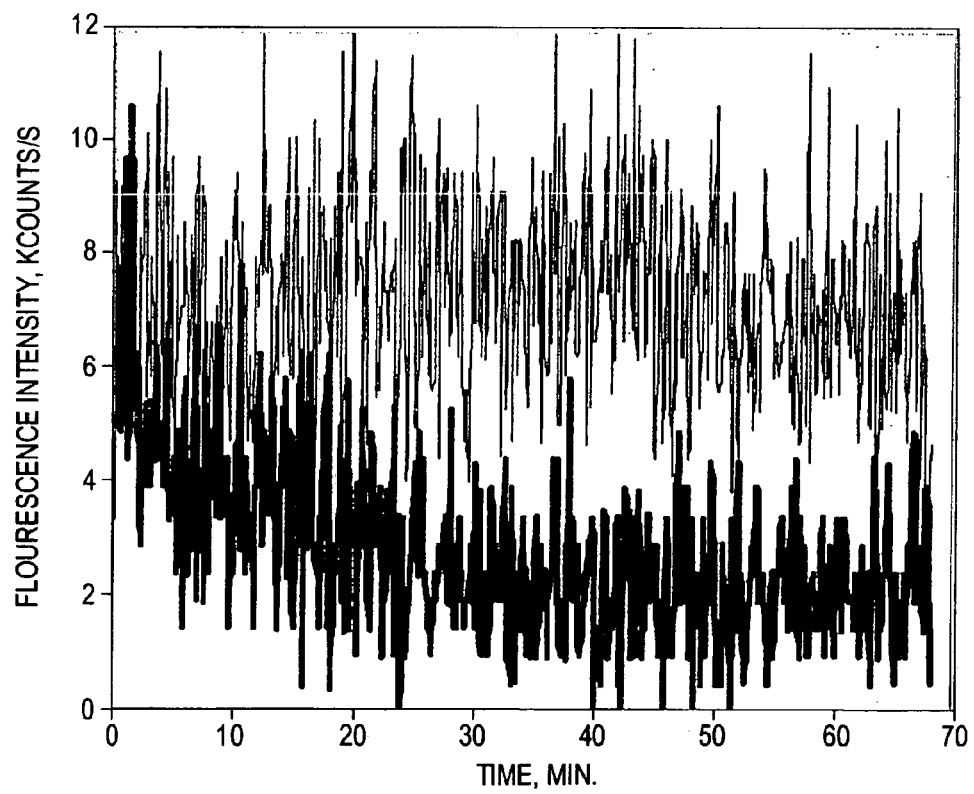

EFFICIENT ROOM-TEMPERATURE SOURCE OF POLARIZED SINGLE PHOTONS

REFERENCE TO RELATED APPLICATIONS

The present application claims the benefit of U.S. Provisional Application No. 60/438,769, filed Jan. 9, 2003, whose disclosure is hereby incorporated by reference in its entirety into the present disclosure.

STATEMENT OF GOVERNMENT INTEREST

The research leading to the present invention was supported in part by the U.S. Army Research Office under Award No. DAAD19-02-1-0285. The work was also supported by the U.S. Department of Energy Office of Inertial Confinement Fusion under Cooperative Agreement No. DE-FC03-92SF19460. The government has certain rights in the invention.

FIELD AND BACKGROUND OF THE INVENTION

The present invention is directed to quantum information technology, e.g., quantum cryptography. It relates to an efficient, room-temperature source of polarized single photons and more particularly to such a source using deterministically aligned single emitters in a planar aligned liquid crystal host.

Quantum information in the form of quantum communications and quantum computing is an exceedingly active field today. See, for instance, the following books: M. A. Nielsen and I. L. Chuang, *Quantum computation and quantum information*, Cambridge: Cambridge Univ. Press, 2001, D. Bouwmeester, A. Ekert, A. Zeilinger, Eds., *The physics of quantum information: quantum cryptography, quantum teleportation, quantum computation*, Springer: Berlin, 2000, and the following review paper: N. Gisin, G. Ribordy, W. Tittel, and H. Zbinden, *Rev. Mod. Phys.*, vol. 74, 145. 2002. Numerous theoretical concepts promise powerful quantum-mechanics-based tools that, to date, wait for realization pending the arrival of reliable hardware. A single-photon source (SPS) that efficiently produces photons with anti-bunching characteristics is one such pivotal hardware element for quantum information technology. Using a SPS, secure quantum communication will prevent any potential eavesdropper from intercepting a message without the receiver's noticing. (E. Klarreich, *Nature*, vol. 418, 270-272, 2002)

In another implementation, a SPS becomes the key hardware element for quantum computers with linear optical elements and photodetectors (See the following paper: E. Knill, R. Laflamme, and G. J. Milburn, *Nature*, vol. 409, 46-52, 2001). Again, its practical realization is held back in part by difficulties in developing robust sources of anti-bunched photons on demand.

In spite of several solutions for SPSs presented in the literature, significant drawbacks remain. They are the reason for current quantum communication systems being baud-rate bottlenecked so that photon numbers from ordinary photon sources may be attenuated to the single-photon level (~0.1 photon per pulse on average). An efficient (with an order of magnitude higher photon number per pulse) and reliable light source that delivers a train of pulses containing one and one photon only is a very timely challenge. To meet this challenge, several issues need addressing, from achieving full control of the quantum properties of the source to easy handling and integrability of these properties in a practical quantum computer and/or communication setup. In addition, in quantum information systems it is desirable to deal with single photons synchronized to an external clock, namely, triggerable single photons. Polarization states of single photons are also important as they enable polarization-qubit encoding of information.

The critical issue in producing single photons by a method other than by trivial attenuation of a beam is the very low concentration of photons emitters dispersed in a host, such that within a laser focal spot only one emitter becomes excited which can emit only one photon at a time. Most current SPSs, e.g., based on semiconductor heterostructures, operate only at liquid He temperature—a major impediment to widespread use. (See the following papers: J. Kim, O. Benson, H. Kan, Y. A. Yamamoto, *Nature*, vol. 397, 500-503, 1999; A. Imamoglu and Y. Yamamoto, *Phys. Rev. Lett.*, vol. 72, 210-213, 1994; E. Moreau, I. Robert, J. M. Gérard, I. Abram, L. Manin, V. Thiery-Mieg, *Appl. Phys. Lett.*, vol. 79, 2865-2867, 2001; P. Michler, A. Kiraz, C. Becher, W. V. Schoenfeld, P. M. Petroff, L. Zhang, E. Hu, A. Imamoglu, *Science*, vol. 290, 2282-2285, 2000; C. Santori, M. Pelton, G. Solomon, Y. Dale, and Y. Yamamoto, *Phys. Rev. Lett.*, vol. 86, 1502-1505, 2001; M. Pelton, C. Santori, J. Vučković, B. Zhang, G. S. Solomon, J. Plant, and Y. Yamamoto, *Phys. Rev. Lett.*, vol. 89, 233602, 2002; Z. L. Yuan, B. E. Kardynal, R. M. Stevenson, A. J. Shields, C. J. Lobo, K. Cooper, N. S. Beattie, D. A. Ritchie, M. Pepper, *Science*, vol. 295, 102-105, 2002).

Of the known room-temperature (RT) SPSs, only those based on single-dye-molecule fluorescence can be used in much higher speed systems than other RTSPSs. This SPS was developed in the following papers: W. P. Ambrose, P. M. Goodwin, J. Enderlein, D. J. Semin, J. C. Martin, R. A. Keller, *Chem. Phys. Lett.*, vol. 269, 365-370, 1997; L. Fleury, J.-M. Segura, G. Zumofen, B. Hecht, and U. P. Wild, *Phys. Rev. Lett.*, vol. 84, 1148-1151, 2000; B. Lounis and W. E. Moerner, *Nature*, vol. 407, 491-493, 2000; F. Treussart, A. Clouqueur, C. Grossman, and J.-F. Roch, *Opt. Lett.*, vol. 26, 1504-1506, 2001; F. Treussart, R. Alleaume, V. Le Floch, L. T. Xiao, J. M. Courty, J. F. Roch, *Phys. Rev. Lett.*, vol. 89, no. 9, 093601-4, 2002, and in the US Patent Application Publication No. 2002/0146052 A1, Oct. 10, 2002 by W. E. Moerner and B. Lounis. Alternatives such as color centers in diamond and colloidal semiconductor CdSe—ZnS quantum dots possess unacceptably long fluorescence lifetimes. For instance, the diamond color center has a 11.6-ns and 22.7 ns fluorescence life time in mono- and polycrystal, and CdSe—ZnS quantum dots one of ~22 ns. (See, for example, the following papers: C. Kurtsiefer, S. Mayer, P. Zarda and H. Weinfurter, "*Phys. Rev. Lett.*, vol. 85, 290-293, 2000; R. Brouri, A. Beveratos, J.-P. Poizat and P. Grangier, *Opt. Lett.*, vol. 25, 1294-1296, 2000; A. Beveratos, R. Brouri, T. Gacoin, J.-P. Poizat, and P. Grangier, *Phys. Rev. A*, vol. 64, 061802(R), 2001; A. Beveratos, S. Kuhn, R. Brouri, T. Gacoin, J. P. Poizat, P. Grangier, *Europ. Phys. Journ. D*, vol. 18, 191-196, 2002; A. Beveratos, R. Brouri, T. Gacoin, A. Villing, J. P. Poizat, P. Granger, *Phys. Rev. Lett.*, vol. 89, no. 18, 187901-4, 2002; P. Michler, A. Imamoglu, M. D. Mason, P. J. Carson, G. F. Strouse, and S. K. Buratto, *Nature*, vol. 406, 968-970, 2000; B. Lounis, H. A. Bechtel, D. Gerion, P. Alivisatos, W. E. Moemer, *Chem. Phys. Lett.*, vol. 329, 399-404, 2000; G. Messin, J. P. Hermier, E. Giacobino, P. Desbiolles, and M. Dahan, *Opt. Lett.*, vol. 26, 1891-1893, 2001).

The key advantage of dye molecules is that their excited-state life-time of only a few nanoseconds permits excitation repetition rates above ~100 MHz. In dye-based SPSs, one of the current challenges is dye bleaching. However, recently single terrylene molecules have been doped into p-terphenyl molecular crystals ($10^{-11}$ moles of terrylene per mole of p-terphenyl) prepared by a sublimation procedure that produced tiny platelets. In this host, the dye is protected from exposure to diffusing quenchers (such as oxygen), and benefits from strong phonon emission into the host, preventing rapid thermal decomposition of the dye under intense illumination (B. Lounis and W. E. Moerner, *Nature*, vol. 407, 491-493, 2000; the US Patent Application 20020146052 A1, Oct. 10, 2002 by W. E. Moemer and B. Lounis; L. Fleury, J.-M. Segura, G. Zumofen, B. Hecht, and U. P. Wild, *Phys. Rev. Lett.*, vol. 84, 1148-1151, 2000). For "thick" p-terphenyl crystals (~10 µm), this system becomes extremely photostable, allowing hours of continuous illumination of individual molecules without photobleaching. It assures long-term spectral stability and reproducibility from one terrylene absorber to the next. Pumped by periodic, short-pulse laser radiation, single photons were generated at predetermined times at pump-pulse-repetition rates within the accuracy of the emission lifetime (~3.8 ns). Technical implementation of this system is difficult as these monoclinic, sublimation-produced microcrystals are stress sensitive and fragile. In addition, terrylene's molecular dipole moment in the p-terphenyl host crystal takes on an orientation perpendicular to the platelet's surface (i.e., perpendicular to the incident light's E-field). This, in turn, leads to poor coupling with the polarized excitation light, prompting poor fluorescence emission even at high excitation intensities (saturation intensity is about 1 MW/cm$^2$ at room temperature).

In spite of the elegance of the terrylene/p-terphenyl experiments, this technology must be considered unrealistic for practical application. Its weak point is also a background from "ordinary photons" from out-of-focus molecules or Raman scattering, because of the very high pumping intensities required. Emitted photons are not polarized deterministically (there is no known, efficient method for aligning rapidly a multitude of micrometer-sized, monoclinic crystallites relative to one another). Note that noncrystalline, amorphous hosts, e.g., polymers, do not (1) offer the same spectral stability in single-molecule emission even in the case of terrylene, (2) provide long-time protection against bleaching. To date, no crystal hosts other than the fragile, sublimated p-terphenyl flakes have been proposed in single-dye-molecule room-temperature experiments.

SUMMARY OF THE INVENTION

It is an object of the present invention to overcome the above deficiencies.

It is in particular an object of the invention to produce deterministically polarized single photons.

It is another object of the invention to do so with a high efficiency.

It is another object of the invention to do so at room temperature.

It is still another object of the invention to do so in such a way that provides long-term protection against bleaching.

It is yet another object of the invention to do so in a way which is suitable for practical applications.

To achieve the above and other objects, the present invention provides new approaches towards an implementation of an efficient, deterministically polarized SPS: (1) using aligned liquid-crystal hosts of either monomeric or oligomeric/polymeric form to preferentially align the single emitters for maximum excitation efficiency. Deterministic emitter alignment will also provide deterministically polarized output photons; (2) using planar-aligned cholesteric liquid crystal hosts as 1-D photonic-band-gap microcavities tunable to the emitter fluorescence band to further increase SPS efficiency; (3) using liquid crystal technology to prevent emitter bleaching. Emitters comprise soluble dye molecules, inorganic nanocrystals or trivalent rare-earth chelates.

The present invention uses single emitters; that is, all emitters should be separated from each other without any aggregate formation with two or more emitters together. Only one emitter should be excited within a focal volume (e.g., ~1 emitter/cubic micron concentration).

It is preferable that the emitter be selected from the group of compounds exhibiting sufficient solubility in the host at or near room temperature. In that context, throughout the disclosure including the claims, it will be understood that "sufficient solubility" is solubility sufficient to provide single emitter concentration. Such sufficient solubility may be low in absolute terms, but it will be sufficient if it meets the above criterion.

BRIEF DESCRIPTION OF THE DRAWINGS

A preferred embodiment of the present invention will be set forth in detail with reference to the drawings, in which:

FIGS. 9A and 9B are coincidence events histograms from host-free single terrylene molecules and an assembly of many uncorrelated molecules within an excitation volume, respectively;

FIG. 12 is a plot of fluorescence bleaching behavior of an assembly of terrylene molecules as a function of time and in two different liquid-crystal hosts: with oxygen depletion (upper curve), and without its depletion (lower curve).

DETAILED DESCRIPTION OF THE INVENTION

A preferred embodiment of the invention and experimental results therefrom will now be set forth in detail with reference to the drawings.

Figure 1:
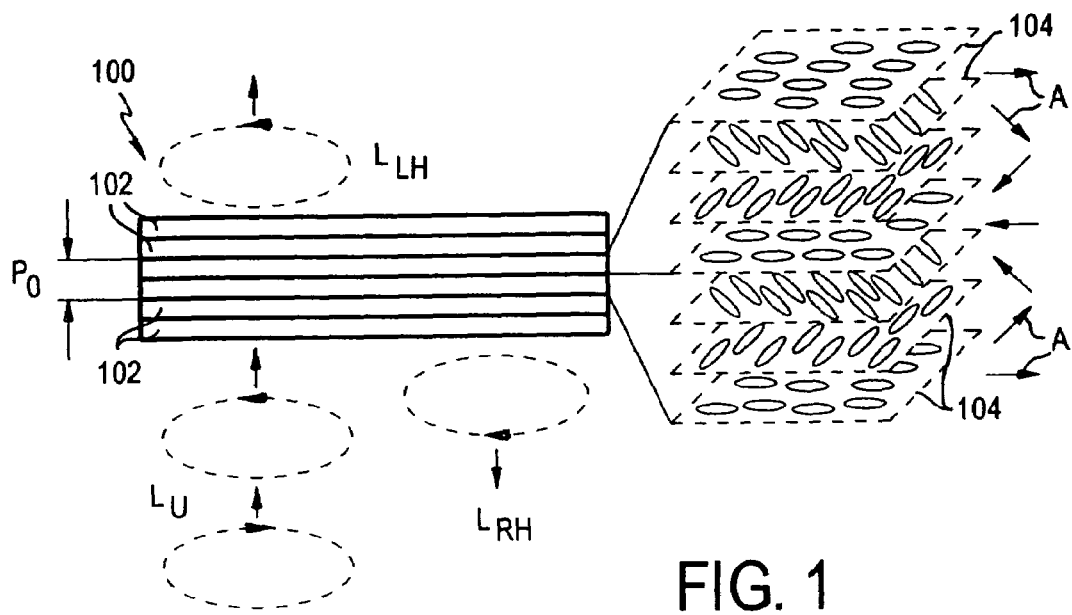
FIG. 1 is a diagram showing the manner in which a planar cholesteric for visualization purposes can be described as consisting of a layered structure and also showing transmission and reflection of a circular polarized light by a 1-D photonic band gap cholesteric liquid crystal layer near selective reflection conditions.
Figure 2:
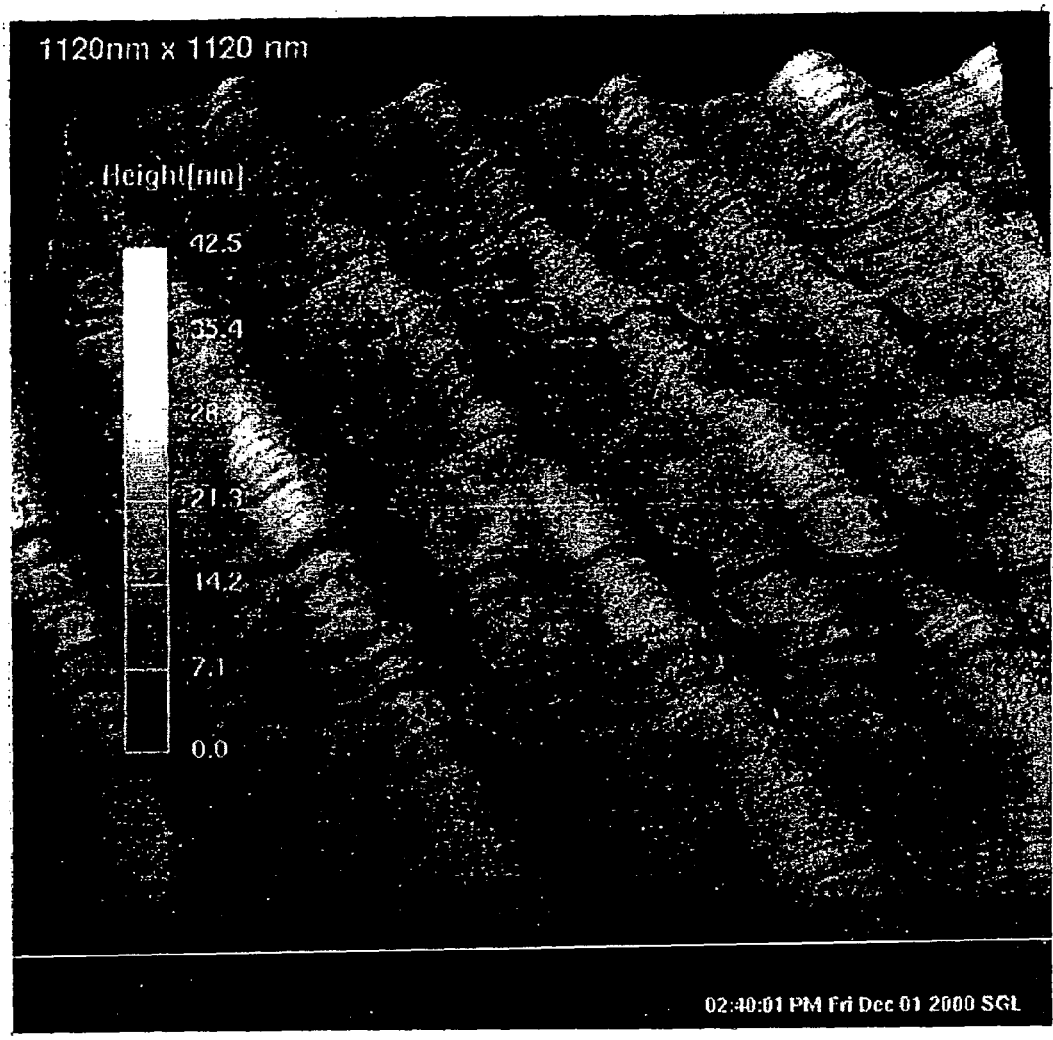
FIG. 2 is a perspective view of the topographical image (1120 nm×1120 nm) for a particular liquid crystal platelet which was cut from a planar-aligned Wacker oligomer cholesteric liquid crystal (OCLC) coating on the substrate and flipped on its side.

For visualization purposes, planar cholesterics (chiral nematics) can be described as consisting of a layered structure (although physically they do not have such a structure). For example, as shown in FIG. 1, a planar-aligned cholesteric 100 can be viewed as made up of a plurality of layers 102, of which expanded views showing the molecular orientations are shown as 104. The axes A of the molecular director (rightmost set of arrows) rotate monotonically to form a periodic helical structure with pitch $P_o$. When a solid, planar-aligned cholesteric is flipped on its side and inspected by a high-resolution tool such as an atomic-force-microscope, the periodic pitch becomes observable through height variations along the helical axis. For instance, FIG. 2 shows such a topography for a Wacker cyclo-tetrasiloxane-oligomer cholesteric liquid-crystal (OCLC) platelet. It was cut from a planar-aligned OCLC coating on the substrate. Periodic stripes in the image correspond to one half of the pitch length.

With few exceptions, liquid-crystal media are non-chiral and require additives to induce the chiral order. Dependent on the chirality-inducing additive, the final structure may show either a right- or a left-handed sense of rotation. For liquid-crystal thicknesses $\geq 10$ µm, the reflectance of normally incident, circularly polarized light with electric-field vector-rotation opposite to the rotation of molecules in the helical structure (Bragg condition), approaches 100% within a band centered at $\lambda_o = n_{av} P_o$ where $n_{av} = (n_e + n_o)/2$ is the average of the ordinary and extraordinary refractive indices of the medium. This is the so-called selective reflection of cholesteric liquid crystals. In the example of FIG. 1, incident unpolarized light $L_U$ with $\lambda_o$ is incident on the chiral nematic 100, and a right-hand circularly polarized component is reflected as right-hand circularly polarized light $L_{RH}$, while a left-hand circularly polarized component is transmitted as left-hand circularly polarized light $L_{LH}$. The bandwidth is $\Delta\lambda = \lambda_o \Delta n / n_{av}$, where $\Delta n = n_e - n_o$.

Such a periodic structure can also be viewed as a 1-dimensional photonic crystal, with a band gap within which propagation of light is forbidden. For emitters located within such a structure, the rate of spontaneous emission is suppressed within the spectral stop band and enhanced near the band edge. Several groups have reported lasing in photonic band gap material hosts, including cholesteric liquid crystals (I. P. Il'chishin, E. A. Tikhonov, V. G. Tishchenko and M. T. Shpak, *JETP Lett.*, vol. 32, 24-27, 1980; V. P. Kopp, B. Fan, H. K. M. Vithana and A. Z. Genack, *Opt. Lett.*, vol. 23, 1707-1709, 1998; H. Finkelman, S. T. Kim, A. Munoz, P. Palffy-Muhoray, B. Taheri, *Adv. Mater.*, vol. 13, no. 14, 1069-1072, 2001).

Generation of strongly circularly polarized photoluminescence from planar-aligned cholesteric liquid crystals was also reported in the following papers: S. H. Chen, D. Katsis, A. W. Schmid, J. C. Mastrangelo, T. Tsutsui, T. N. Blanton, *Nature*, vol. 397, 506-508, 1999; D. Katsis, A. W. Schmid, S. H. Chen, *Liq. Cryst.*, vol. 26, 181-185, 1999; A. Yu. Bobrovsky, N. I. Boiko, V. P. Shibaev, J. H. Wendorff, *Adv. Mater.*, vol. 15, no. 3, 282-287, 2003.

In the experiments to be described herein, monomeric liquid crystal mixtures with a chiral additive, and Wacker siloxane OCLC were doped with terrylene or other dye at extremely low concentration such that the final sample contained only a few molecules per µm² irradiation area. Wacker siloxane OCLC has the following formula:

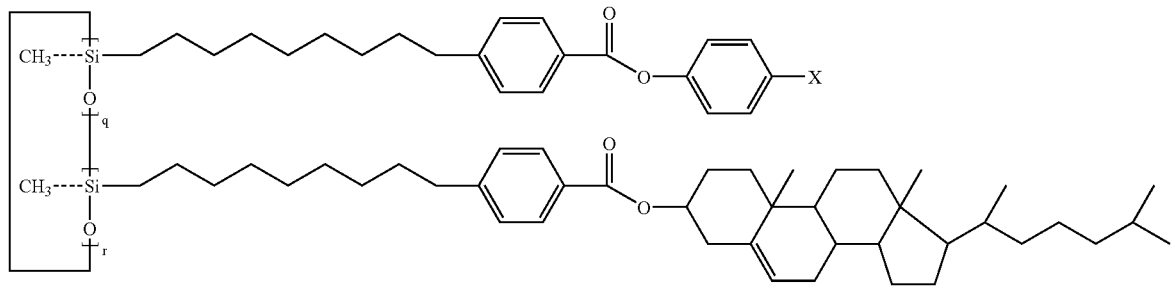

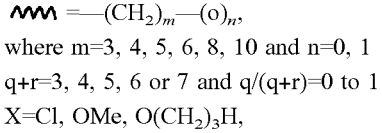

where m=3, 4, 5, 6, 8, 10 and n=0, 1 q+r=3, 4, 5, 6 or 7 and q/(q+r)=0 to 1

X=Cl, OMe, O(CH$_2$)$_3$H,

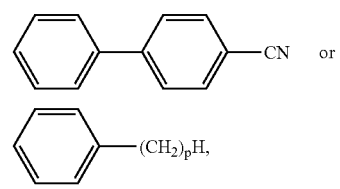

where p=2, 4 or 5 while terrylene has the following formula:

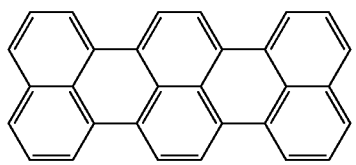

To prepare the 1-D photonic band-gap structures three different planar alignment procedures for liquid crystals were used: (i) substrate shearing, (ii) buffing, (iii) and photoalignment. Two alternate methods were also found satisfactory for planar alignment: either the film was flow aligned by letting the OCLC solution run down a vertically inclined glass slip, or a special glass-cylinder was rolled unidirectionally across a spin-coated OCLC heated to the liquid state (~100° C.) and slowly cooled afterwards.

For sheared samples, no additional substrate coatings were needed. For buffing, substrates were spin coated with either of two polymers: Nylon-6 or Polyimid. For buffing, we used a standard, velvet-surface buffing machine. Single-molecule fluorescence microscopy imposes a requirement on the sample thickness: ~180 and 300 μm-working distance of high N.A. objectives permits use only of samples with thickness not exceeding this value. For this reason, ~170-μm-thickness glass microscopic cover slip substrates (Corning) were used that both are fragile and need special care in handling. To prevent damage to the fragile substrates during the buffing procedure, cover slips were "blocked to" 1-mm-thick microscope slides with water-soluble acetate, using 40-min heating at 80° C. for better results. After buffing, the cover slips were unblocked in standing, deionized water over night. This was followed by a rinse in flowing, deionized water to rid the samples of acetate traces.

For photoalignment, substrates were spin-coated with Staralign. Photoalignment of coated polymer was achieved using six, UV discharge lamps RPR 3000 (Southern New England Ultraviolet Co.) with maximum wavelength ~302 nm (40 nm bandwidth) and a UV linear dichroic polarizer (Oriel), 1.74"×1.74" large, placed in a hermetic box. The photoalignment procedure at ~5 mW/cm$^2$ power density at 302 nm lasted 10 minutes.

We used two types of liquid crystals to prepare layers ranged in thickness from 50 nm to 30 micrometers. In addition to Wacker oligomer cholesteric-liquid-crystal powders described earlier, mixtures of low molecular weight, E7 nematic liquid crystal blend with a chiral additive CB15 were used. Both E7 and CB15 are fluids at room temperature. Both materials were supplied by EM Industries.

For the Wacker oligomer liquid crystal powders, the samples were prepared by mixing different concentration of two powders with individually known selective-reflection wavelengths provided by the vendor. In order to obtain a desired selective-reflection wavelength mixture, mixing rules were found empirically from a set of multiple, different mixtures. To change the pitch of each mixture, powders were dissolved in methylene chloride, mixed for 2 hours under agitation and at elevated temperature, purified through a 0.45-μm particle filter, and dried from solvent under vacuum. For planar alignment an uncoated, cleaned cover slip with a Wacker powder was placed on a hot plate and melted at ~100° C. A second cover slip was used to shear the melted oligomer at temperature (and to also form the second window of the liquid-crystal cell). Slowly cooling the cell to room temperature froze in the planar alignment. For some Wacker powders, we used spin coating with Polyimid and buffing of substrates. Cells with known and uniform thickness (10-15 μm) were created by using 4 drops of a UV-cured epoxy mixed with calibrated, glass-bead spacers at the substrates corners. After that, cells containing Wacker powder were heated into the isotropic phase and slowly cooled.

For low-molecular-weight liquid crystals, the coated substrate surfaces were either buffed or photoaligned. Cell thickness was again set by UV-epoxy mixed with glass-bead spacers. To find the weight concentration of the components C in a mixture of chiral additive and nematic liquid crystal with desired selective reflection wavelength $\lambda_o$ we used a well-known relationship $C=n_{av}/(\lambda_o \times HTP)$, where HTP is the helical twisting power of the chiral additive in a nematic liquid crystal. For CB15 in E7, HTP≈7.3 μm$^{-1}$. An E7+CB15 liquid crystal mixture with selected concentration was fed through a 0.45-μm particle filter and a stainless-steel syringe into the assembled cell parallel to the polymer-alignment direction inscribed in the cell walls.

Figure 3:
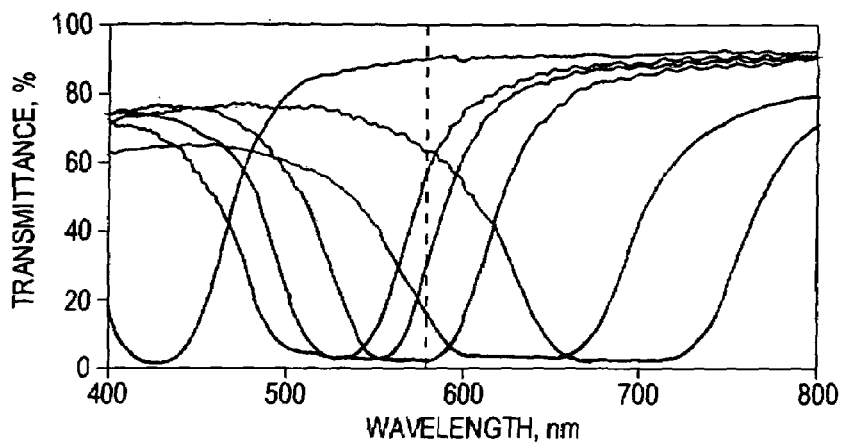
FIG. 3 is a graph showing selective reflection of left-handed circularly polarized light from photonic band gap Wacker OCLCs.

We prepared several tens of planar-aligned cholesteric liquid crystal samples with band gaps in different spectral regions ($\lambda_o$ varied from 430 nm to 2200 nm). We used a Perkin Elmer Lambda 900 spectrophotometer to measure the wavelength response of each prepared sample, thereby determining the specific selective reflection (photonic band gap) for each sample. A zero-order quarter wave plates and a thin-film linear polarizer were used in both spectrophotometer channels to create circularly polarized incident light of desired handedness. Samples were tested in unpolarized, as well as in left-handed, and right-handed circularly polarized incident light. FIG. 3 shows transmittance of Wacker oligomer cholesteric-liquid-crystal samples versus wavelength in left-handed circularly polarized light. In these experiments, we used both pure Wacker OCLCs with selective reflection bands centered around 450 nm, 535 nm and 760 nm, and mixtures of two OCLCs possessing selective reflection closest to the desired wavelength.

Figure 4:
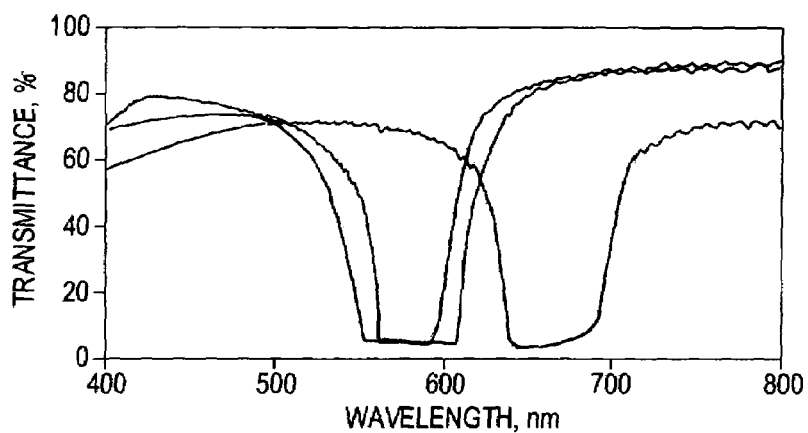
FIG. 4 is a graph showing selective reflection of right-handed circularly polarized light from photonic band-gap E7+CB15 monomeric mixture. Planar alignment was made with the buffing method.
Figure 5:
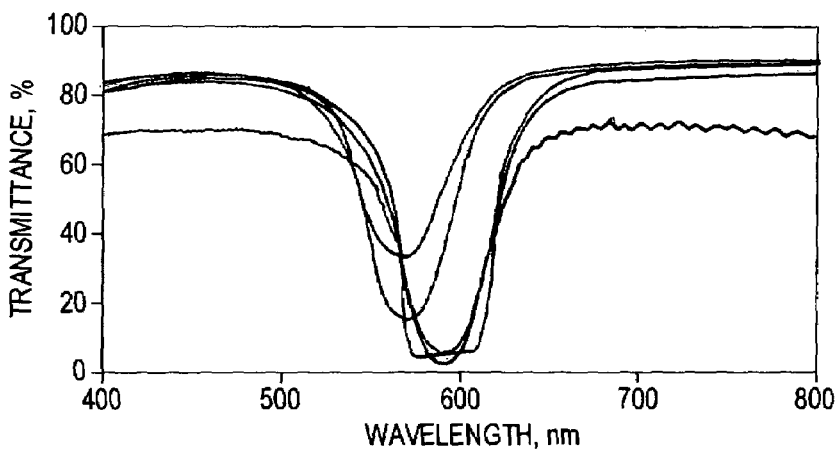
FIG. 5 is a graph showing selective reflection of right-handed circularly polarized light from photonic band gap E7+CB15 monomeric mixture. Planar alignment was made with the photoalignment method.

Similar results were achieved with the E7+CB15 mixture, both with buffed Polyimid/Nylon-6 (FIG. 4) and with photoalignment (FIG. 5), in right-handed circularly polarized light (handedness strictly determined by the CB15 structure).

To minimize false fluorescence contributions by contaminants during single-molecule-fluorescence microscopy, rigorous cleaning of glass substrates is mandatory. Liquid-crystal cells were fabricated in a class 10,000 liquid-crystal clean-room facility. Ultrasonic cleaning for 60 minutes freed the 1"×1" substrates from any dirt particles. Substrates were then rinsed in flowing, deionised water, dried in a stream of compressed nitrogen and washed in toluene from organic components. To remove the toluene substrates were washed again with pure ethanol and dried. After that, they were etched in piranha solution ($H_2SO_2+H_2O_2$ in equal volume concentration) for about 20 minutes, rinsed in flowing, deionized water and dried in a stream of oil-free nitrogen.

Proper terrylene concentration for single-molecule fluorescence microscopy was established by iterative trial and error. In sequential dilution steps of terrylene in chlorobenzene solvent, solutions were spun onto glass slips, and for each concentration, confocal fluorescence microscopy determined the final emitter concentration per irradiation volume. Once single molecules were predominantly observed, the dilution endpoint was reached. This final terrylene solution was mixed with Wacker OCLC starting material (8% weight concentration of oligomer), E7+CB15 or 5CB+CB15 mixtures.

Terrylene's fluorescence maximum lies near 579 nm with a bandwidth of ~30 nm. FIG. 3 (dotted curves) shows matching the cholesteric liquid crystal's $\lambda_o$ to the dye-fluorescence band, but in our current experiments we used Wacker OCLC with $\lambda_o$=2.2 µm, i.e., outside the terrylene-dye-fluorescence band. The liquid crystal was doped with terrylene at an extremely low concentration, such that the final sample contained only a few molecules per µm$^2$ irradiation area.

Figure 6:
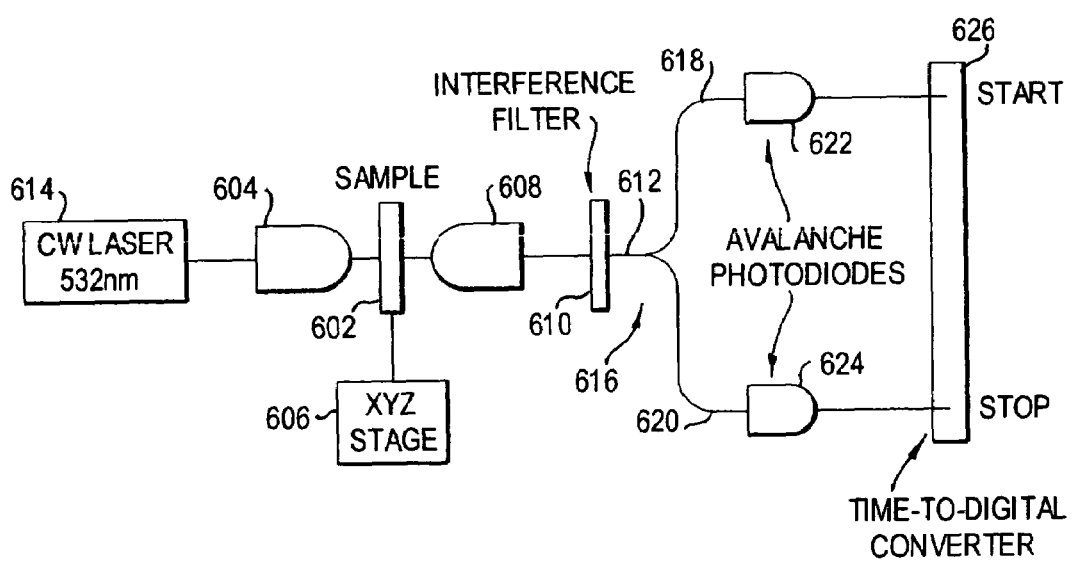
FIG. 6 is a schematic diagram of a device for testing the output of a sample photon source according to the preferred embodiment.

Single molecule fluorescence microscopy and photon antibunching correlation measurements are carried out using a setup 600 shown in FIG. 6. Antibunching is the evidence of a single photon nature of the source. The terrylene-doped liquid crystal sample 602 is placed in the focal plane of a 0.8 N.A. microscope objective of a confocal microscope (Witec alpha-SNOM platform) 604. The sample is attached to a piezoelectric, XYZ translation stage 606. Light emitted by the sample is collected by a confocal setup using a 1.25 N.A., oil-immersion objective 608 and an interference filter 610 together with an aperture in form of the 50-µm-core optical fiber 612.

The cw, spatially filtered through a fiber, linearly polarized (contrast 10$^5$:1), 532-nm diode-pumped Nd:YAG laser output 614, excites single molecules. In focus, the intensities used are of the order of several kW/cm$^2$.

The collection fiber 612 is part of a non-polarization-sensitive 50:50 fiber splitter 616 that forms the two arms of a Hanbury Brown and Twiss correlation setup. Residual, transmitted excitation light is removed by the interference filter 610 (formed of two, additively placed, dielectric interference filters), yielding a combined rejection of better than 6 orders of magnitude at 532 nm.

Photons in the two Hanbury Brown and Twiss arms 618, 620 are detected by identical, cooled avalanche photodiodes 622, 624 in single-photon-counting Geiger mode (SPCM-AQR-14-FC, Perkin Elmer Optoelectronics, Vaudreuil, Canada). The time interval between two consecutively detected photons in separate arms is measured by a 68-ns-full-scale time-to-digital converter (Model 7186, Phillips Scientific) 626 using a conventional start-stop protocol. Within this converter's linear range, the time uncertainty in each channel corresponds to 25 ps.

It was proved experimentally that a very good approximation of the autocorrelation function $g^{(2)}(\tau)$ comes directly from the coincidence counts (event distribution) $n(\tau)$, for relatively low detection efficiency and therefore low counting rate. This justifies the assumption that $n(\tau)$ is proportional to the autocorrelation function $g^{(2)}(\tau)$. For single photons, $g^{(2)}(0)$=0, indicating the absence of pairs, i.e., antibunching.

Figure 7A:
FIGS. 7A and 7B are fluorescence images of samples in which single terrylene molecules are embedded in a Wacker OCLC host and in which clusters of terrylene molecules spin coated onto a bare glass cover slip; respectively (10 µm×10 µm scan)
Figure 7B:
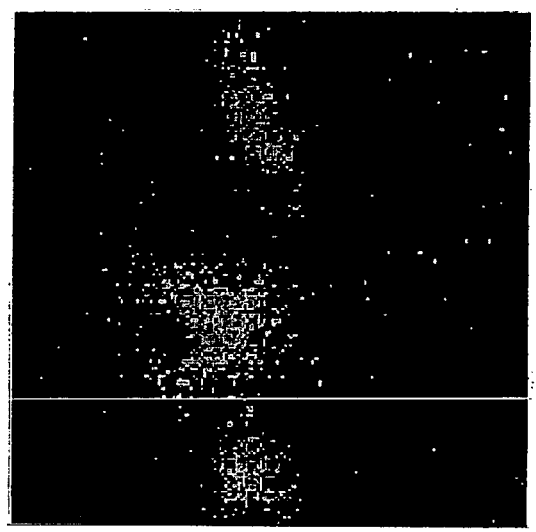

FIGS. 7A and 7B show terrylene-dye-molecule-fluorescence images obtained by confocal fluorescence microscopy. FIG. 7A shows single terrylene molecule embedded in a Wacker OCLC host. FIG. 7B shows clusters of terrylene molecules spin coated from chlorobenzene solution onto a bare glass cover slip. For both images, the scan direction is from left to right and line by line from top to bottom. The scan dimensions are 10 µm×10 µm. Most single molecules in these samples exhibited fluorescence blinking in time, with a period ranging from several milliseconds up to several seconds. That "blinking" behavior by single molecules manifests itself as bright and dark horizontal stripes in the image. These features are absent in emission images from clusters. Blinking is a common phenomenon and convincing evidence of the single-photon nature of the source. Several mechanisms are suggested for the explanation of blinking behavior, for instance, "shelving" (triplet blinking) to the long-living state, and fluctuations in the photo-physical parameters of the molecule and its local environment.

Figure 8:
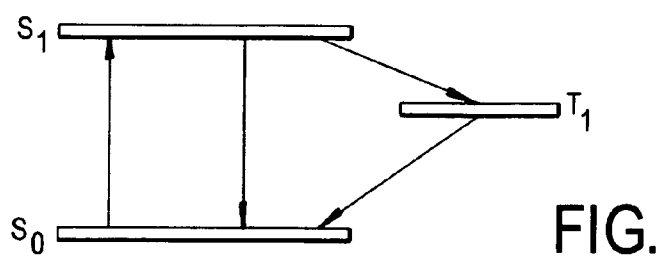
FIG. 8 is a diagram of a three-level system for modeling the operation of the preferred embodiment.

By modeling the molecule as a three-level system (singlet ground state $S_o$, excited state level $S_1$, and triplet state $T_1$) as depicted in FIG. 8, triplet blinking can be explained by a population buildup at the $T_1$ level that is often a dark state in fluorescent dyes. A single-pixel dwell time of ~8 ms does not allow resolution of the lifetime of this triplet state (~10$^{-4}$ s for terrylene in a p-terphenyl). The second mechanism is more plausible for the explanation of long-time intensity fluctuations although the details are not clearly understood.

FIGS. 9A and 9B show a coincidence-count histogram $n(\tau)$ from host-free single terrylene molecules on a bare glass substrate (FIG. 9A) and an assembly of many uncorrelated molecules within the excitation volume (FIG. 9B).

The scan speed is ~3s per line (512 pixels). The left histogram exhibits a dip at $\tau$=0. The measured signal-to-background ratio of our experiments ranges from 2 to 8, so the probability that a photon from the background triggers a coincidence with a photon from the molecule is very low.

Because $n(\tau)$ is proportional to the autocorrelation function $g^{(2)}(\tau)$, $n(0)$~0 means that $g^{(2)}(0)$~0 in the experiments. Two fluorescence photons are not observed within an arbitrarily short time interval. This fluorescence antibunching is due to the finite radiative lifetime of the molecular dipole and is therefore clear proof that we observed the emission from one and only one molecule. The histogram of FIG. 9B from multiple, uncorrelated molecules shows no such dip at $\tau$=0, i.e., no antibunching.

Figure 10A:
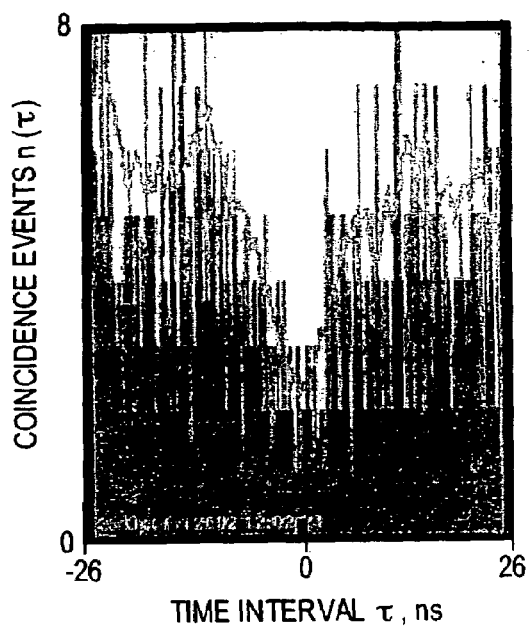
FIGS. 10A and 10B are histograms of coincidence events of the single-terrylene-molecule-fluorescence on a bare glass substrate and of the radiation of scattered light from the excitation laser beam; respectively.
Figure 10B:
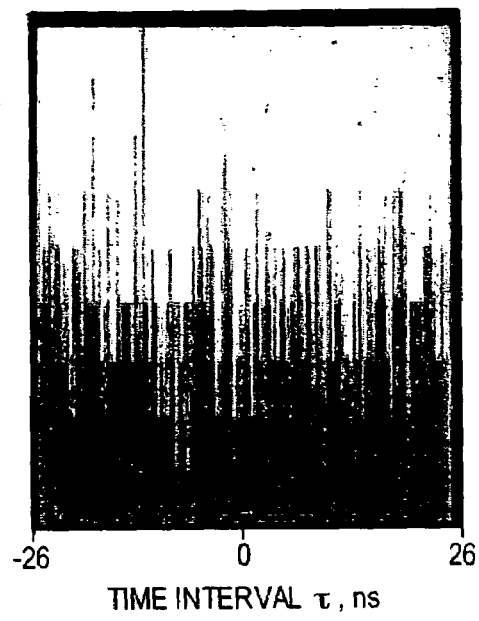

To eliminate any potential for leaked excitation light causing the dip at $\tau$=0, the sample was replaced with a bare glass slide and one blocking interference filter was removed. The coincidence histogram for this condition is depicted in FIG. 10B. No antibunching is observed. The results are shown in FIGS. 10A and 10B, which bear the same relation to each other as do FIGS. 9A and 9B.

Figure 11A:
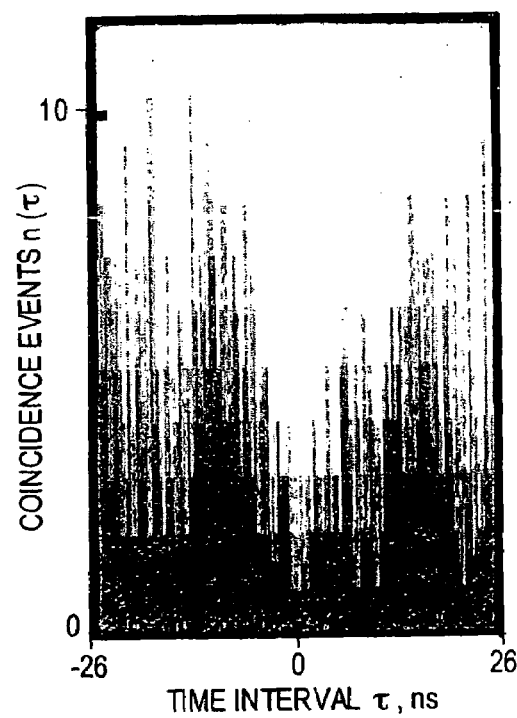
FIGS. 11A and 11B are histograms of coincidence events of the single-terrylene-molecule-fluorescence in a Wacker OCLC host and of an assembly of several uncorrelated molecules, respectively.
Figure 11B:
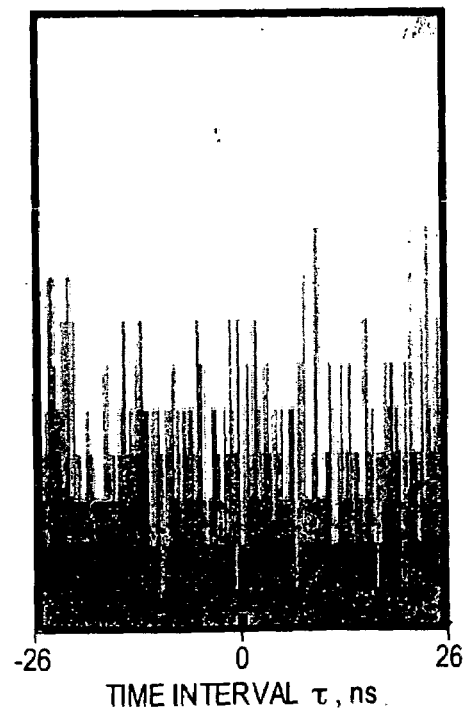

FIGS. 11A and 11B show the results of doping terrylene into liquid crystals. The histogram of coincidence events $n(\tau)$ (FIG. 11A) exhibits a dip at $\tau$=0, indicating photon antibunching in the fluorescence of the single molecules in the Wacker OCLC host; no antibunching is observed in the fluorescence from an assembly of several uncorrelated molecules in the same host, different sample (FIG. 11B). FIG. 11A is noteworthy in that it demonstrates that several single molecules can sequentially contribute to an antibunching histogram without loss of $\tau$=0 contrast, as in practice the long integration time and competing molecule-bleaching events make obtaining an entire, good-contrast histogram from only one molecule too much a matter of luck. When the initial single molecule was bleached, the sample was advanced to another single molecule while the photon-correlation count continued. This finding is crucial for future device implementation.

Practical device implementation also depends on photochemical stability of both emitters and hosts. Terrylene fluorescence stability in monomeric liquid crystal hosts was increased by saturating, prior to cell assembly, the liquid crystals with helium in a sealed glove-box for one hour. Oxygen that is mostly responsible for dye bleaching is displaced by helium during this procedure. FIG. 12 shows fluorescence-bleaching results of terrylene molecules at two-orders-of-magnitude higher concentration than in single-molecule experiments in different liquid crystal hosts: either immobilized in an oligomer cholesteric liquid crystal or dissolved in monomeric cyanobiphenyl 5CB saturated with helium (both at identical excitation intensity and identical terrylene volume concentration). Over the course of more than one hour, no dye bleaching was observed in the oxygen—depleted liquid crystal host (upper curve). Dye bleaching was avoided also in the following paper: L. A. Deschenes and D. A. Vanden Bout, *Science*, vol. 292, 255-258, 2001 for ~1 hour of irradiation by placing the sample under nitrogen during a single-molecule excitation.

Dye bleaching is not a critical impairment for an efficient SPS, but it is an important factor for device simplicity and cost. When one molecule is bleached the system can be rapidly realigned to utilize another isolated dye molecule, allowing practically continuous source action (see FIGS. 9A, 10A, and 11A).

A robust room-temperature single-photon source based on fluorescence from a single-dye-molecule (fluorescence anti-bunching) was demonstrated for the first time for liquid crystal hosts. Planar-aligned, 1-D photonic-band-gap structures in dye-doped cholesteric oligomers were prepared. Avoiding bleaching of the terrylene dye molecules for excitation times >1 hour was achieved by innovative preparation procedures.

Estimating the efficiency of the SPS using conservative value of parameters, a comparison was made of the number of exciting 532-nm photons/s $N_{inc}$ incident on the absorption cross-section area $\sigma$ of a terrylene molecule with a measured photon counting rate from a single molecule $N_{out}$=3 kc/s. For the laser power incident on the sample ~17.5 µW, a beam radius ~0.25 µm, and using measured value of $\sigma$~5×10$^{-17}$ cm$^{-2}$ for terrylene molecules provides $N_{inc}$=1.2×10$^6$ photons/s-mol.

A probability $p_\alpha$ can be evaluated for a single photon to be emitted into an optical fiber core of the Hanbury Brown—Twiss setup of FIG. 6, from the following expression: $2N_{out}=0.95 N_{inc} p_\alpha DQ$. Here D=0.2 is the measured coupling efficiency of the fiber optics used in this setup, Q=0.64 is the photon detection efficiency of the avalanche photodiode (APD) at 579 nm, 0.95 is the coupling efficiency from the fiber to the APD-FC-connector. Those data provide $p_\alpha \approx 4\%$. This rather surprisingly large value is strongly dependent on the measured absorption cross-section for which we used a conservative estimate.

These results can be improved to take advantage of the capabilities offered by the liquid crystal host to increase the excitation and collection efficiency. It can be estimated how the probability $p_\alpha$ might be improved. For instance, he count rate may be increased at least by 2.6-4.3 times by the alignment of the liquid crystal/dye molecules relative to the incident polarization. The efficiency improves a factor between two and three with the microcavity compared to the dye molecules without the cavity. It is safe to say that an SPS efficiency increase of up to one order of magnitude can be expected using planar alignment of a cholesteric host whose photonic band gap matches the dye fluorescence band.

The probability of two-photon emission $P_2$ is approximately $P_2=C_N(0)P_1^2/2$ if $P_2$ is much smaller than unity. $P_1$ is the probability for single photon emission; $C_N(0)$ is the zero time normalized coincidence rate that can be taken directly as the correlation function $g^{(2)}(0)$. For Poissonian light $C_N(0)=1$. For single terrylene molecule fluorescence in a Wacker oligomer liquid crystal host, $C_N(0)=0.25-0.33$. It means that the rate of two-photon pulses is three-four times lower than for Poissonian light. It should be noted that a probability $p_\alpha$ introduced earlier, $p_\alpha=\alpha\, P_1$. Here $\alpha$ is a collection efficiency including losses in filters.

Other possible modifications include increasing the efficiency, life, and polarization purity of the single photon source by improved selection of dye, liquid crystal, and the photonic-band-gap structure matching with the dye fluorescence band. A pulsed laser source can be used to create a real quantum cryptography system with a cholesteric liquid crystal single-photon source on demand.

While a preferred embodiment of the present invention has been set forth above, those skilled in the art who have reviewed the present disclosure will readily appreciate that other embodiments can be realized within the scope of the present invention. Various examples of such other embodiments are mentioned above. Moreover, disclosures of specific liquid crystal hosts are illustrative rather than limiting; any suitable monomeric or oligomeric/polymeric liquid crystal host can be used, and those skilled in the art who have reviewed the present disclosure will readily be able to select an appropriate host. Similarly, disclosures of specific emitters are illustrative rather than limiting. For example, current colloidal semiconductor nanocrystal technology, for instance, using PbSe quantum dots of specific size provides single emitters with a fluorescence in a spectral region between 1000 and 2200 nm, in particular at the communication wavelengths of 1300 and 1500 nm. These quantum dots can be easy dissolved in liquid crystals. Also, numerical values and disclosures of specific hardware are illustrative rather than limiting. For instance, a pulsed laser source can be used to trigger SPS on demand. Therefore, the present invention should be construed as limited only by the appended claims.

We claim:

1. A room-temperature source of polarized single photons, the source comprising:
   a substrate;
   a single light-emitting dye molecule or other, single fluorescence emitter, said single light-emitting dye molecule or other, single fluorescence emitter exhibiting antibunching characteristics; and
   a planar aligned liquid crystal host, disposed on the substrate, the light-emitting dye or other fluorescence emitter being embedded in the host, for aligning molecules of the light-emitting dye or other fluorescence emitters along a preferred direction.

2. The source of claim 1, wherein the host comprises a monomeric, nematic liquid crystal or monomeric, nematic liquid-crystal mixtures.

3. The source of claim 2, wherein the host is a chiral host.

4. The source of claim 2, wherein the host comprises a chiral additive.

5. The source of claim 2, wherein the host is planar aligned and/or has a 1-D photonic band gap tuned to a chromophore fluorescence band of the light-emitting dye or other fluorescence emitter.

6. The source of claim 1, wherein the preferred direction is a direction which maximizes the excitation efficiency of the light-emitting dye or of the other fluorescence emitter.

7. The source of claim 1, wherein the host is an oxygen-depleted liquid crystal host.

8. The source of claim 1, wherein the light-emitting dye or other fluorescence emitter belongs to the group of compounds exhibiting sufficient solubility in the host at or near room temperature.

9. The source of claim 8, wherein the host comprises biphenyl or therphenyl liquid crystals or mixture of biphenyl or therphenyl liquid crystals.

10. The source of claim 8, wherein the single light-emitting dye molecules comprise a dye selected from the group consisting of terrylene, rhodamine, or a rhodamine derivative, Alexa Fluor, DiIC$_{18}$(3), and DiIC$_{18}$(5).

11. The source of claim 8, wherein the other fluorescence emitter comprises a core-shell semiconductor nanocrystal.

12. The source of claim 11, wherein the semiconductor nanocrystal comprises PbSe, CdTe, PbS, or CdS as core material.

13. The source of claim 8, wherein the other fluorescent emitter comprises a trivalent rare-earth chelate.

14. The source of claim 1, wherein the host comprises an oligomeric or polymeric liquid crystal or a mixture of oligomeric or polymeric liquid crystals.

15. The source of claim 14 wherein the host comprises a nematic liquid crystal.

16. The source of claim 14, wherein the host comprises a chiral liquid crystal.

17. The source of claim 15, wherein the host further comprises a chiral additive.

18. The source of claim 14, wherein the host is planar aligned and/or has a 1-D photonic band gap tuned to a chromophore fluorescence band of the light-emitting dye or other fluorescence emitter.

19. The source of claim 14, wherein the light-emitting dye or other fluorescence emitter belongs to the group of compounds exhibiting sufficient solubility in the host at or near room temperature.

20. The source of claim 19, wherein the single light-emitting dye molecules comprise a dye selected from the group consisting of terrylene, rhodamine, or a rhodamine derivative, Alexa Fluor, $DiIC_{18}(3)$, and $DiIC_{18}(5)$.

21. The source of claim 19, wherein the other fluorescence emitter comprises a core-shell semiconductor nanocrystal.

22. The source of claim 21, wherein the semiconductor nanocrystal comprises PbSe, CdTe, PbS, or CdS as core material.

23. The source of claim 19, wherein the other fluorescent emitter comprises a trivalent rare-earth chelate.

24. A method for preparing a room-temperature source of single photons, the method comprising:
  (a) preparing a substrate;
  (b) preparing a planar aligned liquid crystal host, disposed on the substrate, for aligning single molecules of a light-emitting dye or other single fluorescence emitter along a preferred direction; and
  (c) embedding the light-emitting single dye molecules or other single fluorescence emitters in the host such that light-emitting single dye molecules or other single fluorescence emitters exhibit antibunching characteristics.

25. The method of claim 24, wherein step (a) comprises shearing the substrate.

26. The method of claim 24, wherein step (a) comprises mechanically buffing the substrate.

27. The method of claim 26, wherein the substrate is buffed by applying a polymer to the substrate by spin coating the substrate in a solution of the polymer and mechanically buffing the polymer.

28. The method of claim 27, wherein the polymer comprises Nylon-6.

29. The method of claim 27, wherein the polymer comprises polyimid.

30. The method of claim 24, wherein step (a) comprises photoaligning the substrate.

31. The method of claim 30, wherein the substrate is photoaligned by coating the substrate with a photoalignment polymer and photoaligning the photoalignment polymer.

32. The method of claim 31, wherein the photoalignment polymer is photoaligned using linearly polarized ultraviolet light.

33. The method of claim 24, wherein the host comprises a monomeric, nematic liquid crystal or monomeric, nematic liquid-crystal mixtures.

34. The method of claim 24, wherein the host is a chiral host.

35. The method of claim 24, wherein the host comprises a chiral additive.

36. The method of claim 24, wherein the host is a monomeric chiral host or mixture of monomeric chiral hosts.

37. The method of claim 33, wherein the host is planar aligned and/or has a 1-D photonic band gap tuned to a chromophore fluorescence band of the light-emitting dye or of the other fluorescence emitter.

38. The method of claim 24, wherein the preferred direction is a direction which maximizes the excitation efficiency of the light-emitting dye or of the other fluorescence emitter.

39. The method of claim 24, wherein step (b) comprises oxygen-depleting the host.

40. The method of claim 39, wherein the host is oxygen-depleted by treating the host to displace molecular oxygen dissolved in the host with another gas.

41. The method of claim 40, wherein the other gas comprises helium, argon, or nitrogen.

42. The method of claim 24, wherein the light-emitting dye or other fluorescence emitter belongs to the group of compounds exhibiting sufficient solubility in the host at or near room temperature.

43. The method of claim 42, wherein the light-emitting dye comprises a dye selected from the group consisting of terrylene, rhodamine, or a rhodamine derivative, Alexa Fluor, $DiIC_{18}(3)$, and $DiIC_{18}(5)$.

44. The method of claim 42, wherein the other fluorescence emitter comprises a core-shell semiconductor nanocrystal.

45. The method of claim 44, wherein the semiconductor nanocrystal comprises PbSe, CdTe, PbS, or CdS as core material.

46. The method of claim 42, wherein the other fluorescence emitter comprises a trivalent rare-earth chelate.

47. The method of claim 33, wherein the monomeric liquid-crystal or mixture of monomeric liquid crystals is disposed between two of said substrates by
  a. placing not fewer than three spacer bars around the edge of a first one of said substrates and affixing said spacer bars to a surface of said first one of said substrates by adhesive;
  b. making a liquid crystal cell from said two substrates;
  c. spreading a liquid crystal of said monomeric or mixture of monomeric inside said cell.

48. The method of claim 24, wherein the host comprises an oligomeric or polymeric liquid crystal or a mixture of oligomeric or polymeric liquid crystals.

49. The method of claim 48, wherein the host comprises a nematic oligomeric or polymeric liquid crystal or mixture of oligomeric or polymeric liquid crystals resulting in a predominantly nematic phase.

50. The method of claim 48, wherein the host further comprises a chiral additive.

51. The method of claim 48, wherein the host comprises a chiral oligomeric or polymeric liquid crystal or mixture of chiral oligomeric or chiral polymeric liquid crystals.

52. The method of claim 48, wherein the host is planar aligned and/or has a 1-D photonic band gap tuned to a chromophore fluorescence band of the light-emitting dye or of the other fluorescence emitter.

53. The method of claim 48, wherein the host is oxygen depleted by treating the host to displace molecular oxygen dissolved in the host with another gas.

54. The method of claim 53, wherein the host is dissolved in a solvent.

55. The method of claim 54, wherein the other gas is helium, argon, or nitrogen and the mixture is filtered, in order to remove particulate introduced by the displacement of the molecular oxygen and/or other particulate.

56. The method of claim 48, wherein the light-emitting dye or other fluorescence emitter is doped into the host in solution form, the solvents of the host and the solvent of the dopant being miscible within one another.

57. The method of claim 48, wherein the light-emitting dye or other fluorescence emitter belongs to the group of compounds exhibiting sufficient solubility in the host at or near room temperature.

58. The method of claim 57, wherein the light-emitting dye comprises a dye selected from the group consisting of terrylene, rhodamine, or a rhodamine derivative, Alexa Fluor, $DiIC_{18}(3)$, and $DiIC_{18}(5)$.

59. The method of claim 57, wherein the other fluorescence emitter comprises a core-shell semiconductor nanocrystal.

60. The method of claim 59, wherein the semiconductor nanocrystal comprises PbSe, CdTe, PbS, or CdS as core material.

61. The method of claim 57, wherein the other fluorescence emitter comprises a trivalent rare-earth chelate.

62. The method of claim 56, wherein the oxygen-depleted host is dried from solvents by vacuum distillation to powdery dryness.

63. The method of claim 62, wherein the liquid-crystal oligomer or polymer or mixture of liquid-crystal oligomers or polymers is disposed between two of said substrates by
 a. placing not fewer than three spacer bars around the edge of a first one of said substrates and affixing said spacer bars to a first surface of said first one of said substrates by adhesive;
 b. spreading a layer of said oligomer or polymer powder on said first surface;
 c. placing a first side of a second one of said substrates first side on the liquid-crystal powder layer to form a substrate liquid-crystal sandwich;
 d. heating said sandwich for 10 to 30 minutes to a melting and clearing temperature of the liquid-crystal host;
 e. shearing the liquid-crystal host by parallel motion relative to each other of the two substrates along the plane over distances of millimeters in a forward-backward motion sequence; and
 f. slowly cooling said sandwich at rest until room temperature is reached.

64. A device for emitting polarized single photons, the device comprising:
 a photon source comprising: two substrates; a single molecule of light-emitting dye or other single fluorescence emitter; and a planar aligned liquid crystal host, disposed between the substrates, the light-emitting dye or other fluorescence emitter being embedded in the host, for aligning molecules of the light-emitting dye or of the other fluorescence emitter along a preferred direction;
 a light source of preferred polarization state for causing excitation light to be incident on a portion of the photon source to excite one single emitter at a time to emit the polarized single photons;
 means for collecting emitted photons in a controlled manner; and
 means for discriminating excitation light from emitted light.

65. The device of claim 64, wherein the exciting light source comprises a laser.

66. The device of claim 65 wherein the laser is either CW or pulsed.

67. The device of claim 65 wherein the laser wavelength is inside an absorption band or a two/three photon absorption band of the dye or the other emitter.

68. The device of claim 64, wherein the exciting light source further comprises an objective lens for focusing the excitation light from the laser onto the portion of the photon source.

69. The device of claim 64, wherein the host is a liquid-crystal host with a room- or near-room-temperature mesophase.

70. The device of claim 69, wherein the liquid-crystal host is an oxygen-depleted liquid crystal.

71. The device of claim 69, wherein the liquid-crystal host is a monomeric liquid crystal or a monomeric, liquid-crystal mixture.

72. The device of claim 71, wherein the liquid crystal is nematic.

73. The device of claim 71, wherein the host is a chiral liquid crystal.

74. The device of claim 71, wherein the host further comprises a chiral additive.

75. The device of claim 71, wherein the host is a planar aligned and/or has a 1-D photonic band gap tuned to a chromophore fluorescence band of the light-emitting dye or of the other fluorescence emitter.

76. The device of claim 64, wherein the preferred direction is a direction which maximizes the excitation efficiency of the light-emitting dye or of the other fluorescence emitter.

77. The device of claim 71, wherein the light-emitting dye or other fluorescence emitter belongs to the group of compounds exhibiting sufficient solubility in the host at or near room temperature.

78. The device of claim 77, wherein the single light-emitting dye molecule comprises a dye selected from the group consisting of terrylene, rhodamine, or a rhodamine derivative, Alexa Fluor, $DiIC_{18}(3)$, and $DiIC_{18}(5)$.

79. The device of claim 77, wherein the other single fluorescence emitter comprises a core-shell semiconductor nanocrystal.

80. The device of claim 79, wherein the semiconductor nanocrystal comprises PbSe, CdTe, PbS, or CdS as core material.

81. The device of claim 77, wherein the other single fluorescence emitter comprises a trivalent rare-earth chelate.

82. The device of claim 71, wherein the host comprises a biphenyl or terphenyl liquid crystal or a mixture of monomeric biphenyl or terphenyl liquid crystals.

83. The device of claim 64, wherein the host comprises an oligomeric or polymeric liquid crystal or a mixture of oligomeric or polymeric liquid crystals.

84. The device of claim 83, wherein the host comprises a nematic oligomeric or nematic polymeric liquid crystal.

85. The device of claim 83, wherein the host comprises a chiral oligomeric or chiral polymeric liquid crystal.

86. The device of claim 83, wherein the host further comprises a chiral additive.

87. The device of claim 83, wherein the host is planar aligned and/or has a 1-D photonic band gap tuned to a chromophore fluorescence band of the light-emitting dye or of the other fluorescence emitter.

88. The device of claim 83, wherein the light-emitting dye or other fluorescence emitter belongs to the group of compounds exhibiting sufficient solubility in the host at or near room temperature.

89. The device of claim 88, wherein the light-emitting dye comprises a dye selected from the group consisting of terrylene, rhodamine, or a rhodamine derivative, Alexa Fluor, $DiIC_{18}(3)$, and $DiIC_{18}(5)$.

90. The device of claim 88, wherein the other fluorescence emitter comprises a core-shell semiconductor nanocrystal.

91. The device of claim 90, wherein the semiconductor nanocrystal comprises PbSe, CdTe, PbS, or CdS as core material.

92. The device of claim 88, wherein the other fluorescence emitter comprises a trivalent rare-earth chelate.

93. The device of claim 64, wherein the means for collecting emitted photons in a controlled manner comprises a reflective or refractive optical element collimating light from a point source.

94. The device of claim 64, wherein the means for discriminating emitted light from excitation light comprises a plane-parallel absorbing-glass filter, multilayer dielectric-thin-film stack or stacks, or a reflective or transmissive diffractive element.

95. A method for producing polarized single photons, the method comprising:
(a) providing a source which comprises a substrate, single molecules of a light-emitting dye or other single fluorescent emitters and a planar aligned liquid crystal host, disposed on the substrate, the light-emitting dye or other fluorescence emitter being embedded in the host, for aligning molecules of the light-emitting dye or the other fluorescence emitter along a preferred direction;
(b) providing a light source for causing polarized excitation light to be incident on a portion of the photon source to excite, at any one time, one and only one dye molecule or other fluorescence emitter to emit the polarized single photons; and
(c) discriminating the emitted light from the excitation light.

96. The method of claim 95, wherein the host is a liquid crystal disposed in a substrate/liquid-crystal/substrate sandwich structure.

97. The method of claim 95, wherein the host comprises a monomeric, liquid crystal or monomeric, liquid-crystal mixtures.

98. The method of claim 97, wherein the host comprises a nematic liquid crystal.

99. The method of claim 97, wherein the host is a chiral host.

100. The method of claim 97, wherein the host comprises a chiral additive.

101. The method of claim 95, wherein the host is planar aligned and/or has a 1-D photonic band gap tuned to a chromophore fluorescence band of the light-emitting dye or of the other fluorescence emitter.

102. The method of claim 95, wherein the preferred direction is a direction which maximizes an excitation efficiency of the light-emitting dye or of the other fluorescence emitter.

103. The method of claim 97, wherein host comprises oxygen-depleted host.

104. The method of claim 103, wherein the host is oxygen-depleted by treating the host to displace molecular oxygen dissolved in the host with another gas.

105. The method of claim 104, wherein the other gas comprises helium, argon, or nitrogen.

106. The method of claim 95, wherein the light-emitting dye or other fluorescence emitter belongs to the group of compounds exhibiting sufficient solubility in the host at or near room temperature.

107. The method of claim 106, wherein the light-emitting dye comprises a dye selected from the group consisting of terrylene, rhodamine, or a rhodamine derivative, Alexa Fluor, $DiI_{18}(3)$, and $DiI_{18}(5)$.

108. The method of claim 106, wherein the other fluorescence emitter comprises a core-shell semiconductor nanocrystal.

109. The method of claim 108, wherein the semiconductor nanocrystal comprises PbSe, CdTe, PbS, or CdS as core material.

110. The method of claim 106, wherein the other fluorescence emitter comprises a trivalent rare-earth chelate.

111. The method of claim 95, wherein the host comprises an oligomeric or polymeric liquid crystal or a mixture of oligomeric or polymeric liquid crystals.

112. The method of claim 111, wherein the host comprises a nematic oligomerics or nematic polymeric liquid crystal or mixture of oligomeric or polymeric liquid crystals resulting in a predominantly nematic phase.

113. The method of claim 111, wherein the host further comprises a chiral additive.

114. The method of claim 111, wherein the host comprises a chiral oligomeric or polymeric liquid crystal or mixture of chiral oligomeric or chiral polymeric liquid crystals.

115. The method of claim 111, wherein the host is planar aligned and/or has a 1-D photonic band gap tuned to a chromophore fluorescence band of the light-emitting dye or of the other fluorescence emitter.

116. The method of claim 95, wherein the preferred direction is a direction which maximizes the excitation efficiency of the light-emitting dye or of the other fluorescence emitter.

117. The method of claim 111, wherein the host is oxygen depleted by treating the host to displace dissolved molecular oxygen in the host with another gas.

118. The method of claim 117, wherein the other gas is helium, argon, or nitrogen and the mixture is filtered, in order to remove particulate introduced by displacement of the molecular oxygen and/or other particulate.

119. The method of claim 111, wherein the light-emitting dye or other fluorescence emitter belongs to the group of compounds exhibiting sufficient solubility in the host at or near room temperature.

120. The method of claim 119, wherein the light-emitting dye comprises a dye selected from the group consisting of terrylene, rhodamine, or a rhodamine derivative, Alexa Fluor, $DiIC_{18}(3)$, and $DiIC_{18}(5)$.

121. The method of claim 119, wherein the other fluorescence emitter comprises a core-shell semiconductor nanocrystal.

122. The method of claim 121, wherein the semiconductor nanocrystal comprises PbSe, CdTe, PbS, or CdS as core material.

123. The method of claim 119, wherein the other fluorescence emitter comprises a trivalent rare-earth chelate.

124. The method of claim 95, in which the polarized excitation light is focussed by a reflective or transmissive focussing element into the liquid-crystal layer of the substrate/liquid-crystal/substrate sandwich such that the focal volume intercepts one and only one dye molecule or other fluorescence emitter.

125. The method of claim 95, comprising translating laterally the substrate/liquid-crystal/substrate sandwich such that whenever a single dye molecule or other single fluorescence emitter irreversibly photobleaches, another single emitter can be moved into the excitation-light focal volume.

126. The method of claim 95, wherein the reflective or transmissive focussing element is also the optical element collecting the emitted light.

127. The source of claim 1, wherein the source is a source of deterministically polarized single photons.

128. The source of claim 1, further comprising:
a source of excitation light onto the single light-emitting dye molecule or other, single fluorescence emitter such that a single photon is emitted.

* * * * *